(12) United States Patent
Abrahamson

(10) Patent No.: US 8,639,604 B1
(45) Date of Patent: Jan. 28, 2014

(54) SYSTEM AND METHOD FOR MANAGING TAX-DEFERRED RETIREMENT ACCOUNTS

(75) Inventor: Darwin K. Abrahamson, Portland, OR (US)

(73) Assignee: Invest N Retire, LLC, Portland, OR (US)

(*) Notice: Subject to any disclaimer, the term of this patent is extended or adjusted under 35 U.S.C. 154(b) by 1470 days.

(21) Appl. No.: 10/973,483

(22) Filed: Oct. 26, 2004

(51) Int. Cl.
*G06Q 40/00* (2012.01)

(52) U.S. Cl.
USPC ............................ 705/36 R; 705/35; 705/37

(58) Field of Classification Search
None
See application file for complete search history.

(56) References Cited

U.S. PATENT DOCUMENTS

| | | | |
|---|---|---|---|
| 4,953,085 A | 8/1990 | Atkins | |
| 5,418,888 A | 5/1995 | Alden | |
| 5,517,406 A * | 5/1996 | Harris et al. | 705/30 |
| 5,812,987 A | 9/1998 | Luskin et al. | |
| 5,819,230 A | 10/1998 | Christie et al. | |
| 5,819,238 A | 10/1998 | Fernholz | |
| 5,852,811 A | 12/1998 | Atkins | |
| 5,864,828 A | 1/1999 | Atkins | |
| 5,875,437 A | 2/1999 | Atkins | |
| 5,884,285 A | 3/1999 | Atkins | |
| 5,911,135 A | 6/1999 | Atkins | |
| 5,911,136 A | 6/1999 | Atkins | |
| 5,918,218 A * | 6/1999 | Harris et al. | 705/37 |
| 5,978,778 A | 11/1999 | O'Shaughnessy | |
| 5,991,744 A | 11/1999 | DiCresce | |
| 6,012,043 A | 1/2000 | Albright et al. | |
| 6,012,044 A | 1/2000 | Maggioncalda et al. | |
| 6,018,722 A | 1/2000 | Ray et al. | |
| 6,021,397 A | 2/2000 | Jones et al. | |
| 6,041,313 A | 3/2000 | Gilbert et al. | |
| 6,219,650 B1 | 4/2001 | Friend et al. | |
| 6,253,192 B1 | 6/2001 | Corlett et al. | |
| 6,275,814 B1 | 8/2001 | Giansante et al. | |
| 6,321,212 B1 | 11/2001 | Lange | |
| 6,336,102 B1 | 1/2002 | Luskin et al. | |
| 6,338,047 B1 | 1/2002 | Wallman | |
| 6,360,210 B1 | 3/2002 | Wallman | |
| 6,393,409 B2 | 5/2002 | Young et al. | |
| 6,584,451 B1 | 6/2003 | Shoham et al. | |
| 6,601,044 B1 | 7/2003 | Wallman | |
| 6,615,188 B1 * | 9/2003 | Breen et al. | 705/37 |
| 6,684,190 B1 | 1/2004 | Powers et al. | |
| 7,050,998 B1 * | 5/2006 | Kale et al. | 705/36 R |

(Continued)

FOREIGN PATENT DOCUMENTS

WO 97/22075 A1 6/1997

OTHER PUBLICATIONS

Safeco Life & Investments Introduces Safeco Multi-share Class 401(k) Program, PR Newswire, New York: Jan. 8, 2004.*

(Continued)

*Primary Examiner* — Rajesh Khattar
*Assistant Examiner* — Carol See
(74) *Attorney, Agent, or Firm* — Cox Smith Matthews Incorporated; Courtenay B. Allen

(57) ABSTRACT

A system and method of managing tax-deferred retirement accounts that enable the participants to invest in exchange traded funds (ETFs) and to forecast and intelligently plan for their retirement savings needs. The system and method preferably allow each participant to select an asset allocation model pursuant to which their investments will be managed and periodically rebalance the portfolio of each participant based on the selected asset allocation model.

8 Claims, 13 Drawing Sheets

(56) References Cited

U.S. PATENT DOCUMENTS

| | | | |
|---|---|---|---|
| 7,062,458 | B2 | 6/2006 | Maggioncalda et al. |
| 7,117,176 | B2* | 10/2006 | Wallman ..................... 705/36 R |
| 7,149,713 | B2 | 12/2006 | Bove et al. |
| 7,174,313 | B1 | 2/2007 | Martinez |
| 7,552,082 | B2 | 6/2009 | Wallman |
| 2001/0034684 | A1 | 10/2001 | Cushing et al. |
| 2001/0037276 | A1 | 11/2001 | Kelly et al. |
| 2002/0002521 | A1* | 1/2002 | Shearer et al. .................. 705/36 |
| 2002/0022982 | A1 | 2/2002 | Cooperstone et al. |
| 2002/0035527 | A1* | 3/2002 | Corrin ............................ 705/35 |
| 2002/0059127 | A1 | 5/2002 | Brown et al. |
| 2002/0062271 | A1 | 5/2002 | Breuninger |
| 2002/0091604 | A1 | 7/2002 | Loeper |
| 2002/0099640 | A1 | 7/2002 | Lange |
| 2002/0103852 | A1 | 8/2002 | Pushka |
| 2002/0128947 | A1 | 9/2002 | Sauter et al. |
| 2002/0138299 | A1 | 9/2002 | Nations |
| 2002/0138383 | A1 | 9/2002 | Rhee |
| 2002/0138386 | A1 | 9/2002 | Maggioncalda et al. |
| 2002/0161682 | A1 | 10/2002 | Ewing et al. |
| 2002/0169701 | A1 | 11/2002 | Tarbox et al. |
| 2002/0174045 | A1 | 11/2002 | Arena et al. |
| 2002/0174047 | A1* | 11/2002 | Fernholz ......................... 705/36 |
| 2002/0188536 | A1 | 12/2002 | Milosavljevic et al. |
| 2002/0188540 | A1 | 12/2002 | Fay et al. |
| 2002/0194098 | A1 | 12/2002 | Stiff et al. |
| 2002/0198801 | A1 | 12/2002 | Dixon et al. |
| 2003/0009403 | A1 | 1/2003 | Sapp |
| 2003/0009406 | A1 | 1/2003 | Ross |
| 2003/0018557 | A1 | 1/2003 | Gilbert et al. |
| 2003/0023544 | A1 | 1/2003 | Chodes |
| 2003/0028466 | A1 | 2/2003 | Jenson et al. |
| 2003/0033191 | A1 | 2/2003 | Davies et al. |
| 2003/0093303 | A1 | 5/2003 | Pooler |
| 2003/0093342 | A1 | 5/2003 | Hillman et al. |
| 2003/0093353 | A1 | 5/2003 | Ward et al. |
| 2003/0105692 | A1 | 6/2003 | Gilbert et al. |
| 2003/0105697 | A1 | 6/2003 | Griffin et al. |
| 2003/0120508 | A1 | 6/2003 | Kizor et al. |
| 2003/0167220 | A1 | 9/2003 | Schoen et al. |
| 2003/0172018 | A1 | 9/2003 | Chen et al. |
| 2003/0177084 | A1 | 9/2003 | Cassani et al. |
| 2003/0195827 | A1 | 10/2003 | Lichtig, III |
| 2003/0208432 | A1 | 11/2003 | Wallman |
| 2003/0212622 | A1 | 11/2003 | Wallman |
| 2003/0229561 | A1 | 12/2003 | Wallman |
| 2004/0024677 | A1 | 2/2004 | Wallman |
| 2004/0024678 | A1 | 2/2004 | Wallman |
| 2004/0024679 | A1 | 2/2004 | Wallman |
| 2004/0039667 | A1 | 2/2004 | Winklevoss et al. |
| 2004/0039675 | A1 | 2/2004 | Wallman |
| 2004/0049448 | A1 | 3/2004 | Glickman |
| 2004/0078244 | A1 | 4/2004 | Katcher |
| 2004/0088236 | A1 | 5/2004 | Manning |
| 2004/0117286 | A1 | 6/2004 | Charnley, Jr. |
| 2004/0158517 | A1 | 8/2004 | Mahaney et al. |
| 2004/0199447 | A1 | 10/2004 | Treynor |
| 2004/0225548 | A1 | 11/2004 | Aldrich et al. |
| 2005/0010516 | A1 | 1/2005 | Ivanov et al. |
| 2005/0049952 | A1 | 3/2005 | Carter |
| 2005/0065873 | A1 | 3/2005 | Hendrickson et al. |
| 2005/0075971 | A1 | 4/2005 | Delaney |
| 2005/0154662 | A1 | 7/2005 | Langenwalter |
| 2005/0177509 | A1 | 8/2005 | Mahaney et al. |
| 2006/0129439 | A1 | 6/2006 | Arlt et al. |
| 2006/0184449 | A1 | 8/2006 | Eder |
| 2006/0190378 | A1 | 8/2006 | Szydlo |
| 2007/0083454 | A1 | 4/2007 | Anderson et al. |
| 2007/0083455 | A1 | 4/2007 | Bove et al. |
| 2010/0138332 | A1 | 6/2010 | Seaman et al. |

OTHER PUBLICATIONS

Mason, Todd, His visible fees are tricky to market, The Philadelphia Inquirer, May 2004.*

Firms produce ETF products to meet heavy demand, Defined Contribution News, New York: Oct. 18, 2004.*

Fulcrum Financial Inquiry LLP, Form ADV Part II—p. 1 and Schedule F, Uniform Application for Investment Adviser Registration, Nov. 20, 2003, (5 pages).

Oster, Christopher and Damato, Karen, Big Fees Take Toll on 401(K) Plans of Small Employers, The Wall Street Journal Online, Oct. 21, 2004, p. D1.

Zapson, Marsha, 401(K) Plans Add ETFs, Exchange-Traded Funds Report, Issue No. 47, Oct. 2004, pp. 1, 7, and 10.

PLANSPONSOR.com, Table of Contents: Bells & Whistles, Oct. 2004, pp. 1-3.

Giegerich, Andy, Evolution of the 401(K), The Business Journal, Sep. 17, 2004, pp. 1-3, vol. 21, No. 29, Portland, Oregon.

ETFguide.com, NASDAQ ETFs to Be Offered in 401 (K) Plan, etfguide, Sep. 15, 2004.

Bucci, Peter, NASDAQ Cracks Open 401(K) Plans to ETFs, IGNITES.com, Sep. 2004.

Checkler, Joseph, NASDAQ ETFs Offered on 401(K) Platform, Financial-Planning.com, Sep. 7, 2004.

Katzeff, Paul, ETFs Trying to Expand in 401(K) Plans, Investor's Business Daily, Sep. 3, 2004, pp. 1-2.

Carrel, Lawrence, 401(K) Plans May Offer ETFs, SmartMoney.com, Sep. 3, 2004.

Schneyer, Fred, K Plan Provider Adds ETFs, Plansponsor.com, Sep. 2, 2004.

Spence, John, NASDAQ ETFs Join 401(K) Provider Lineup, CBS Marketwatch.com, Sep. 2, 2004.

Lee, Wayne, NASDAQ ETFs Added to Invest N Retire's 401(K) Plans, Nasdaq and Invest n Retire, Sep. 2, 2004.

Miller, Rick, ETFs on the Way for 401(K)s? InvestmentNews, Aug. 23, 2004.

Oster, Christopher, ETFs Catching on With 401(K) Plans, The Wall Street Journal, Jul. 14, 2004, pp. 1-2.

Demby, Elayne Robertson, Exchange-Traded Funds Enter 401(K) Investment Arena, Employee Benefit Adviser, Jul. 2004 pp. 1-3.

Undoing the 401(K) Monopoly; An Interview With Darwin Abrahamson of Invest N Retire, LLC, ETFguide.com, Jun. 30, 2004.

Keefe, John, Asset Mix: Role "Play", NewsDash from Plansponsor. com, Jun. 1, 2004, pp. 1-3.

Mason, Todd, His Visible Fees Are Tricky to Market, The Philadelphia Inquirer, philly.com, May 2004, pp. 1-2.

The 12th Annual Defined Contribution/401(k) Conference, Staying Abreast of Changing DC/401(K) Trends, Issues, Legislation, and Best Practices, Feb. 8-10, 2004, Orlando, Florida.

Southall, Brooke, Efforts Fail to Bring Cheap 401(K)s to Small Businesses, Investment News, Feb. 9, 2004, pp. 1-2.

Myers, Randy, The Bottom Line: Needful Things?, PlanSponsor Magazine, Feb. 2004, pp. 1-4.

Blank, Herb, Addressing the Defined Contribution Plan Dilemma, Pensions & Investments, The International Newspaper of Money Management, Nov. 1, 2003, pp. 1-4.

French, Kristen, INR Offers First 401(K) ETF Option With Barclays IShares, Financial Planning Interactive, The Thomson Corporation, Oct. 2, 2003, pp. 1-2.

Blank, Herb, Flexibility, Liquidity, Transparency and Low Costs Exchange Traded Funds, Sep. 2003, pp. 1-20, P & I Custom Publishing, New York, NY.

Southall, Brooke, Omnibus Plan Makes IShares Viable for 401(K)s, InvestmentNews, Sep. 8, 2003, 1-2.

Abrahamson, Darwin, IShares Included As an Investment Option in the 401(K) Solution, Invest N Retire, LLC Press Release, Sep. 4, 2003.

Jack Piazza, Sensible Investment Strategies, "Rebalancing Your Portfolio" Rebalancing Your Portfolio—the key to controlling risk, http://www.seninvest.com/article9.htm (printed Aug. 7, 2007).

Fidelity Investments, "Why Rebalance to Your Desired Asset Allocation?" Retirement Plan—Guidelines for Rebalancing your Portfolio, http://personal.fidelity.com/planning/retirement/content/how_to_rebalance.shtml (printed Jan. 10, 2008).

U.S. Securities and Exchange Commission, "Beginners' Guide to Asset Allocation, Diversification, and Rebalancing" http://www.sec.gov/investor/pubs/assetallocation.htm (printed Aug. 7, 2007).

(56) References Cited

OTHER PUBLICATIONS

TD Ameritrade, "Portfolio Investing: Get a diversified portfolio tailored to your goal." Investment Portfolio—TD Ameritrade—Goal based portfolio diversification, http://www.tdameritrade.com/planningretirement/portfolioguidance/portfolioinvesting.html (printed Aug. 7, 2007).

John R. Nofsinger, "Continuing Process," Investment Blunders of the Rich and Famous . . . and What You Can Learn from Them, Chapter 15, preview only: http://safari.oreilly.com/0130668419/pref01 (printed on Jan. 10, 2008).

Barra, "Checking portfolio efficiency with implied alpha" www.barra.com/support/library/implied_alphas.pdf (Last modified Mar. 11, 2005).

Eaton Vance Corp. New Release, "Eaton Vance Announces Launch of the Supplemental Retirement Account: A Tax-Advantaged Non-Qualified Retirement Savings Program" (Nov. 15, 2006).

Office Action dated Feb. 17, 2010 in U.S. Appl. No. 12/021,833 (23 Pages).

Firms produce ETF products to meet heavy demand, Defined Contribution News, New York: Oct. 18, 2004 (2 pages).

May 26, 2010 Interview Summary in related U.S. Appl. No. 12/021,833 (1 page).

Aug. 31, 2010 Office Action in related U.S. Appl. No. 12/021,833 (22 pages).

Dec. 28, 2010 Interview Summary in related U.S. Appl. No. 12/021,833 (3 pages).

Mar. 9, 2011 Office Action in related U.S. Appl. No. 12/021,833 (25 pages).

Sep. 16, 2011 Notice of Allowance in related U.S. Appl. No. 12/021,833 (10 pages).

Sep. 19, 2011 Examiner Interview Summary in related U.S. Appl. No. 12/021,833 (2 pages).

Reish, Fred, Just Out of Reish: Affirmative Actions, PlanSponsor Magazine, Nov. 2002 (2 pages).

\* cited by examiner

Data Input Page

The 401(k) Solution
Retirement Calculator

| Retirement Fund | |
|---|---|
| Present age | 29 |
| Retirement age | 65 |
| Estimated annual inflation – default 3% | 3 % |
| Target annual rate of return (ROR) – default 7% | 7 % |
| Annual income | $ 100,000 |
| Annual increase in salary – default 3% | 3 % |
| Percent of current income desired at retirement | 75 % |
| Employee contribution – default is current election | 3 % |
| Employer matching is 50% of Employee's first 5% | |
| Value of 401(k) retirement savings | $ 22,331 |
| Tax-deferred retirement savings; e.g., IRA | $ 0 |
| Taxable retirement savings; e.g., Money Market | $ 0 |

Use our popup calculator for math functions: + – multiply

Use the mouse or key pad
to input numbers and math functions.
Click the = sign to complete calculation.

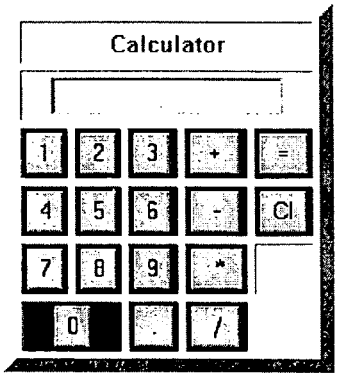

FIG. 3

RESULTS

| Savings Earmarked for Retirement | |
|---|---:|
| Value of 401k retirement savings | $22,331 |
| Value of tax-deferred retirement savings | $0 |
| Value of taxable retirement savings | $0 |
| Future value of retirement savings | $925,224 |
| Retirement fund need at retirement age | $2,122,240 |
| Shortage at retirement | $1,197,016 |
| Additional amount you need to save annually | $8,038 |
| Addtional percent of annual income needed | 8% |
| Asset allocation model: Preservation | |

| Summary |
|---|
| 401(k) Contribution: Your contribution election is less than your employer's maximum matching contribution. |
| The results indicate that you will have a shortage at retirement. Your options: target a higher rate of return (ROR), save more, re-evaluate the income you need at retirement or retire later – for details click. |

| Assumptions | |
|---|---:|
| Age | 29 |
| Age at retirement | 65 |
| Life expectancy – IRS unisex life expectancy table | 82 |
| Years of investing | 36 |
| Years of payout | 17 |
| Marginal tax rate | 28% |
| Employee contribution election | 3% |
| Target annual rate of return | 7% |
| Estimated annual inflation | 3% |
| Estimated annual salary increase | 3% |
| Annual income | $100,000 |
| Percent of current income desired at retirement | 75% |
| Income need computing inflation or salary increase | $217,371 |

FIG. 4

401(k) Tax Advantage Calculator

| The 401k Tax Advantage | | |
|---|---|---|
| Annual Income | 100,000 | |
| Tax Bracket | 28% | |
| Target rate of return (ROR) | 7 % | default 7% |
| Employee Contribution | 3 % | default is your current election |
| Employer matching is 50% of Employee's first 5% | | |

| | Taxable Savings | Savings 401k Plan | Dollar 401 Gain | Percent 401 Gain |
|---|---|---|---|---|
| Employee Contribution | $3,000 | $3,000 | | |
| Employer Matching | | $1,500 | | |
| Tax Deduction | ($840) | ($ 0) | | |
| Annual Savings | $2,160 | $4,500 | $2,340 | 108% |
| Future Value (FV) | | | | |
| FV 5 yrs | $12,254 | $26,847 | $14,594 | 119% |
| FV 10 years | $28,011 | $64,907 | $36,896 | 132% |
| FV 15 years | $48,273 | $118,861 | $70,588 | 146% |
| FV 20 years | $74,329 | $195,347 | $121,019 | 163% |
| FV 25 years | $107,834 | $303,777 | $195,943 | 182% |
| FV in xx yrs  0 | $0 | $0 | $0 | N/A% |

FIG. 5

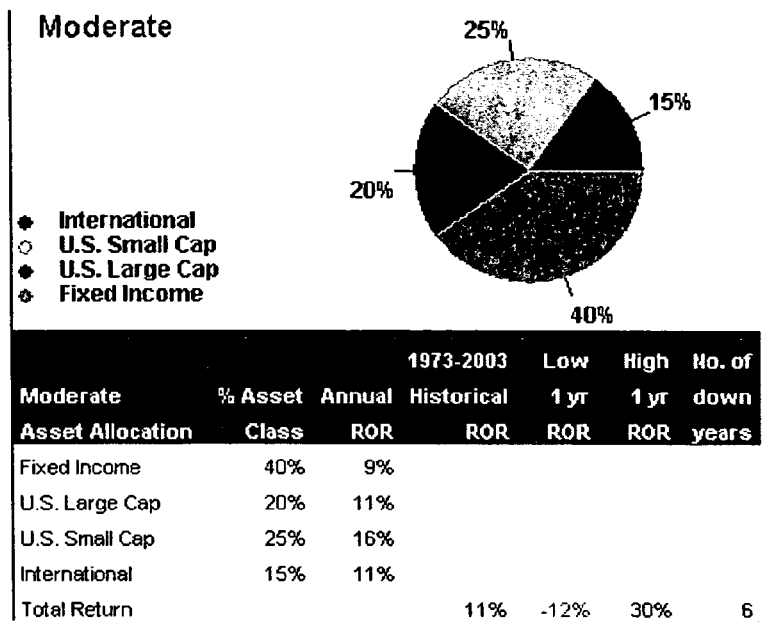

- International
- U.S. Small Cap
- U.S. Large Cap
- Fixed Income

| Moderate Asset Allocation | % Asset Class | Annual ROR | 1973-2003 Historical ROR | Low 1 yr ROR | High 1 yr ROR | No. of down years |
|---|---|---|---|---|---|---|
| Fixed Income | 40% | 9% | | | | |
| U.S. Large Cap | 20% | 11% | | | | |
| U.S. Small Cap | 25% | 16% | | | | |
| International | 15% | 11% | | | | |
| Total Return | | | 11% | -12% | 30% | 6 |

| Moderate Asset Allocation Model | | |
|---|---|---|
| Asset Class and Fund Name | Current Percent | Reallocate Percent |
| Cash | 0.00% | 0% |
| Gartmore Stable Value Fund | 0.00% | 0% |
| First Trust Money Market | 0.00% | 0% |
| Fixed Income | 0.00% | 40% |
| BGI iShares 20+ Yr Tr Bond | 0.00% | 12% |
| BGI iShares Lehman 7-10 Yr Tr | 0.00% | 16% |
| BGI iShares Lehman 1-3 Yr Tr | 0.00% | 12% |
| International | 21.78% | 15% |
| DFA Int'l Value | 10.34% | 10% |
| DFA Emerging Mkts Value | 11.44% | 5% |
| U.S. Large Cap | 29.08% | 20% |
| DFA Large Cap Value | 15.02% | 0% |
| BGI iShares S&P 500 Value | 0.00% | 10% |
| BGI iShares Russell 1000 Value | 0.00% | 0% |
| BGI iShares S&P 500 | 14.06% | 10% |
| U.S. Small Cap | 49.15% | 25% |
| DFA U.S. Small Cap Value | 20.01% | 9% |
| DFA U.S. Small Cap | 0.00% | 8% |
| DFA Real Estate Securities | 14.62% | 8% |
| BGI iShares Russell 2000 Growth | 0.00% | 0% |
| BGI iShares Russell 2000 | 14.52% | 0% |
| BGI iShares Russell 2000 Value | 0.00% | 0% |

Fig. 6

SYSTEM AND METHOD FOR MANAGING TAX-DEFERRED RETIREMENT ACCOUNTS

BACKGROUND

1. Field of the Invention

This invention relates generally to management of tax-deferred retirement accounts, and more particularly to a system and method of managing tax-deferred retirement accounts that enables the participants to invest in exchange traded funds (ETFs) and to forecast and intelligently plan for their retirement savings needs.

2. Description of the Related Art

Policy-makers and researchers have an acute interest in the growth of pension plans and their relationship in influencing work and retirement, saving and consumption, and well-being in old age. Analysts concerned about poverty and income sufficiency acknowledge that pensions play a key role in the well-being of the elderly. Traditional pension plans, such as defined benefit plans that promised each employee a certain amount of his or her salary at retirement, placed responsibility for retirement planning for each employee on the employer, making the employer a "fiduciary." However, over the past several years, there has been a shift from defined benefit plans to self-directed defined contribution plans, such as 401(k) plans. Consequently, with the proliferation of 401(k) plans, responsibility for retirement planning has shifted away from the employer and now rests squarely on the shoulders of each individual plan participant. By and large, the plan participants are not well equipped to handle such responsibility.

In 1995, researcher John Shoven confirmed that pension assets grew faster than total wealth in the United States during the 1980's, leading Shoven to conclude that "pensions are how America saves." At the same time that pension wealth has grown, there has been a revolution in the pension industry, as defined contribution plans, and 401(k) plans in particular, have become the pension plans of choice. Defined contribution plans increased from 13 to 30 percent between 1975 and 1985 and then to 42 percent in 1992. By 1997, defined contribution plans rose to 53 percent. See *Defined Contribution Plan Dominance Grows Across Sectors* . . . , special report by Kelly Olsen and Jack Van Derhei, Employee Benefit Research Institute, October 1997, Special Report 190, Washington, D.C. By projecting trends on pension contributions, the U.S. Department of Labor in 1997 concluded that more money is going into private 401(k) plans than all other private pension plans combined. Most of the contributions are coming directly from workers.

At the same time, there was a similar shift in the responsibility for managing assets in employer-sponsored retirement plans. Previously, the Chief Investment Officers and Chief Financial Officers of employer companies acted not only as the trustee for the plan but also as the investment officer for the plan. However, with the shift to defined contribution plans, the overwhelming majority of workers participating in 401(k) plans are required to manage the investment of their retirement savings directly. In this brave new world, workers not only have to determine when to start saving for retirement and how much to contribute to their retirement accounts, they also must decide how to allocate their retirement funds across various types of assets.

Unfortunately, as illustrated by a Watson Wyatt study, participant directed 401(k) plans are lagging behind institutional investors' returns in defined benefit plans by two percent (2%) annually. At first blush, a two percent (2%) difference may appear insignificant; however, the difference over a thirty-year period is staggering. For workers, a thirty-year period represents the average time horizon between mid-career and mid-retirement. Over a period of thirty years, $100,000 invested at ten percent (10%) will earn $1,744,940, while the same $100,000 invested at eight percent (8%) will earn only $1,006,266. In this example, the missing two percent compounds to nearly three-quarters of a million missing dollars.

As reported by The Profit Sharing/401(k) Council of America, by the end of 2003 there were over 42 million 401(k) plan participants with $1.9 Trillion invested. With the proliferation of participant-directed 401(k) plans, more employees are directing the investment of their pension plan assets, despite the fact that most of them do not feel up to the task as evidenced by a number of surveys. The surveys reveal that most participants do not have a sufficient understanding of investment concepts and principles in order to make their own, well-informed investment decisions. For example, in a 1996 survey by Merrill Lynch, 53% of employees said that their employers do not provide sufficient investment related materials; 80% said that educational materials or assistance would help them make better decisions; and 66% said that estimating the amount needed to be saved for retirement was the least covered topic. Similarly, in a Watson Wyatt survey of 622 companies, 66% of the employees rated printed information as not effective, 58% said that their plan does not project future account balances, and 90% said that their employers were not effective in communication. Clearly, 401(k) participants do understand that they are not prepared to make basic investment decisions which are necessary in order for them to achieve their retirement goals. Faced with overwhelming doubt, participants often turn to coworkers, friends, and the anecdotal information they read in newspaper and magazine articles for guidance in making their investment decisions. In 1996, Dalbar Financial Services reported that 83% of the respondents expect their employers to provide them with "investment education." The September 1997 issue of *Pension and Investments* confirms this trend: "Participant demand for investment education and information grows . . . . " Participants are requesting help from their employers. Unfortunately, today's typical 401(k) plan service provider simply directs a participant's attention to numerous mutual funds, focusing on "past performance" rather than concentrating on the retirement goal of each plan participant. The consequence of the "performance disease" is low returns, high costs, and inattention to the risks and rewards of asset allocation.

Currently 401(k) service providers have no real solution for helping participants meet their retirement goals. Firms such as Financial Engines, Clear Choice, and Plan Tools, who are third party Registered Investment Advisory firms, offer online investment advice through generic risk/reward scenarios after the participant completes a risk/reward questionnaire. Based on the results of the questionnaire indicating the participant's risk tolerance, a portfolio of funds is recommended. However, using this methodology, a portfolio is recommended which may not meet the actual retirement needs of the participant. Furthermore, in the case of Financial Engines, the recommended portfolio only illustrates the highest probability that the participant will achieve his or her retirement goal.

Another alternative currently available to participants is to choose an asset allocation model based solely on the participant's age. This alternative is offered by several mutual fund companies. Lifestyle funds are designed under the assumption that every participant of the same age should have the same investment options, regardless of current financial status or future income needs. Lifestyle funds have proven to be an expensive investment choice since mutual fund families add an additional management fee on top of the other management fees and costs of the underlying funds.

The services offered by such firms as Financial Engines, Clear Choice, and Plan Tools are additional services that are not required to manage and administer a 401(k) plan. Consequently, those firms add additional costs to each plan participant. Furthermore, those firms do not participate in the selection process for choosing appropriate investment vehicles for the plan. Consequently, those firms are not facilitating the plan sponsor or the participants in choosing appropriate investment options for the plan. This deficiency completely precludes their ability to recommend a well-structured asset allocation model.

Lifestyle funds are funds of funds created by mutual fund families. Participants usually are allowed to select one or more lifestyle funds based on their planned retirement date or using their current age. That is, as the participant moves closer to retirement age, the portfolio mix continues to increase in bonds and decrease in equities. According to a study conducted by Hewitt Associates, participants don't even understand the principle behind lifestyle funds and end up choosing several lifestyle funds for a portfolio mix. According to that study, most of the participants were not matching their risk profile with their age in order to choose a lifestyle fund. "Many participants who used lifestyle funds weren't choosing one lifestyle fund, but allocating to several lifestyle funds at once," said Lori Lucas, a defined contribution consultant with Hewitt Associates. "Clearly, lifestyle funds are not being used as the simple, straightforward investment solution they are intended to be."

According to a research study conducted by HeWitt, nearly a third (30%) of plans offered a lifestyle option in 1999. Peter Lynch, former manager of the Fidelity Magellan Fund, disputes the theory that a person's age should dictate the person's investment portfolio. In his book, *Beating the Street*, Lynch stated that "this popular prescription, stocks for the young, bonds for the old, is . . . obsolete."

Another major shortcoming of lifestyle funds is the fact that lifestyle funds only rely on two of the five asset classes; i.e., stocks and bonds. To compound this shortcoming, in the stock class, the majority of lifestyle funds use 100 percent large cap stocks and in the bond class, the majority of lifestyle funds use 100 percent long-term bonds.

Another major problem with current 401(k) plans involves the high investment costs and expenses which participants are paying for their mutual fund investment options. The 401k Provider Directory Averages Book "found that investment expenses account for upwards of 81% of total plan costs in smaller plans and 98% in larger plans." Seventy-one percent (71%) of all assets in defined contribution plans are mutual funds, which carry high management fees. See Brief of US Retirement Assets 2003, Investment Company Institute, June 2004. Unfortunately, high fees and expenses result in lower retirement income for plan participants.

Exchange traded funds have much lower fees and expenses than mutual funds. However, to date, exchange traded funds have been available only through self-directed brokerage accounts or collective trusts. Unfortunately, the commission costs associated with trading ETFs through a self-directed brokerage account makes it prohibitive for 401(k) participants who invest in incremental amounts each pay period. Similarly, plan sponsors who may wish to offer ETFs to their plan participants through a collective trust are finding that the annual administrative costs, per collective trust, average $5,000 plus, which makes collective trusts prohibitive. Therefore, the costs associated with self-directed brokerage accounts and collective trusts negate any benefit participants might have enjoyed through those investment vehicles.

Accordingly, it would be a significant advancement in the art to provide a system and method of managing tax deferred retirement accounts that enable the participants to realize the reduced costs of exchange traded funds and to forecast and intelligently plan for their retirement savings needs.

BRIEF DESCRIPTION OF THE DRAWINGS

FIG. 3 is a sample computer software screen layout showing a data input page of a retirement calculator in accordance with the present invention.

FIG. 4 is a sample computer software screen layout showing a results page of a retirement calculator in accordance with the present invention.

FIG. 5 is a sample computer software screen layout showing a 401(k) tax advantage calculator in accordance with the present invention.

FIG. 6 is a sample illustration of a moderate asset allocation model in accordance with the present invention.

DETAILED DESCRIPTION OF A PREFERRED EMBODIMENT

Figure 1:
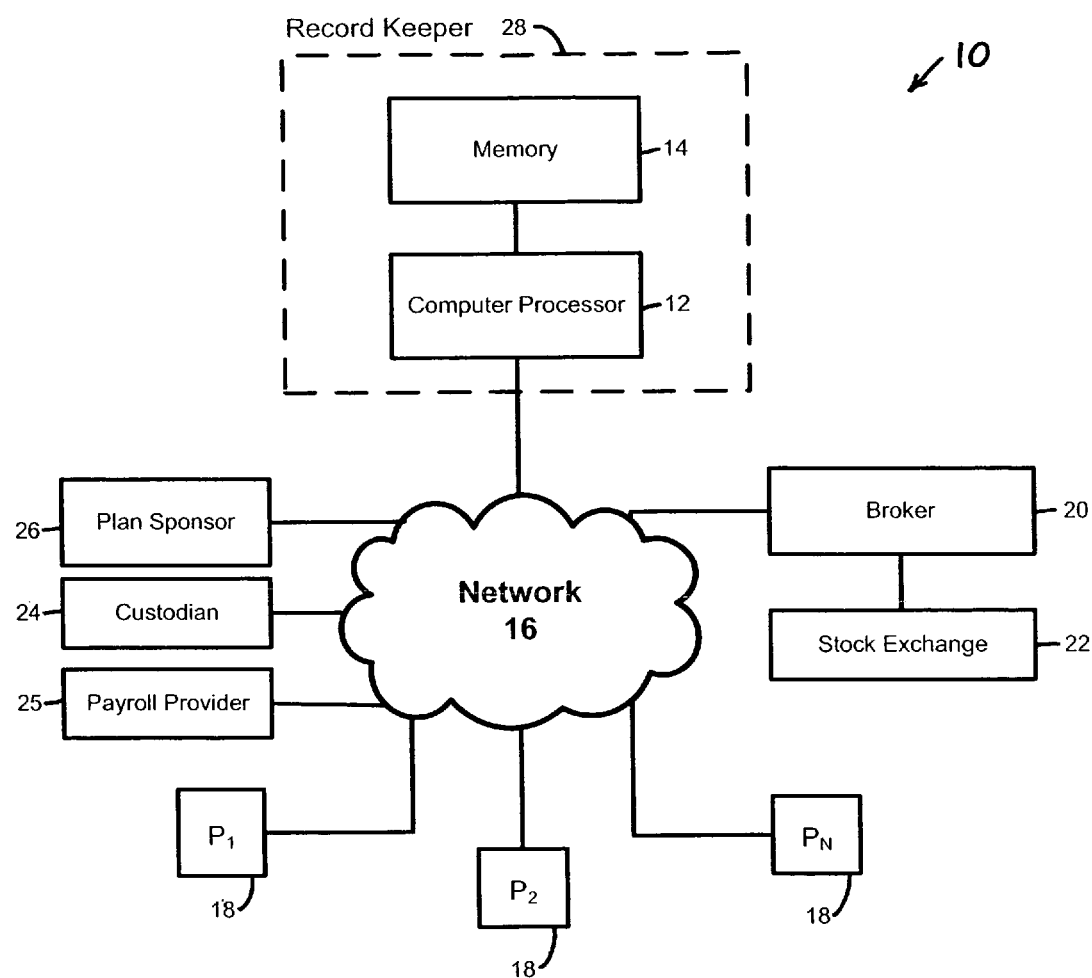
FIG. 1 is a schematic block diagram of a system for managing tax deferred retirement accounts in accordance with the present invention.

Referring to FIG. 1, a system 10 for managing tax-deferred retirement accounts in accordance with the present invention preferably comprises a computer processor 12 with an associated memory 14. Computer processor 12 may be any suitable computer processor, such as a general purpose computer, a workstation, a personal computer, a microprocessor, a digital signal processor, or the like. Computer processor 12 is preferably connected via a network 16 to a plurality of other computer processors 18 that are respectively associated with a plurality of participants $P_1$ through $P_N$ in one or more tax-deferred retirement plans, such as 401(k) plans. Network 16 may be any suitable network, such as the Internet. The record keeper (RK) 28 is the person or entity that manages computer processor 12 to implement the method of the present invention. Computer processor 12 is preferably further connected via network 16 to a computer processor 20 associated with a securities broker, a processor 24 associated with the custodian of the plan assets, a processor 25 associated with the payroll provider, and a processor 26 associated with the plan sponsor. Broker computer 20 is preferably connected to another computer processor 22 associated with a stock exchange. Although only one plan sponsor 26, custodian 24, payroll provider 25, broker 20, and stock exchange 22 are shown for the sake of simplicity, persons of skill in the art will recognize that more than one plan sponsor, custodian, payroll provider, broker, and stock exchange may be included in system 10. A computer software program, which includes a record keeping system (RKS) as further described herein, is preferably stored in memory 14 for execution on computer processor 12 to carry out the method of the present invention as further described below.

A system 10 and method in accordance with the present invention preferably focuses on the participants' (account holders') retirement goals. In the case of an individual investing for retirement through, for example, a 401(k) plan offered by an employer, the system and method focus on the plan participant's retirement goals, and preferably assist the plan participant in achieving those goals through a method implemented in computer software. Preferably, that software is made accessible to a plan participant through a password-protected Internet website. In a preferred embodiment, the present method provides participants with investment concepts and principles, answers to frequently asked questions (FAQs) on investing and retirement planning, articles on finances and investments, investment calculators, and pre-designed asset allocation models.

Figure 2:
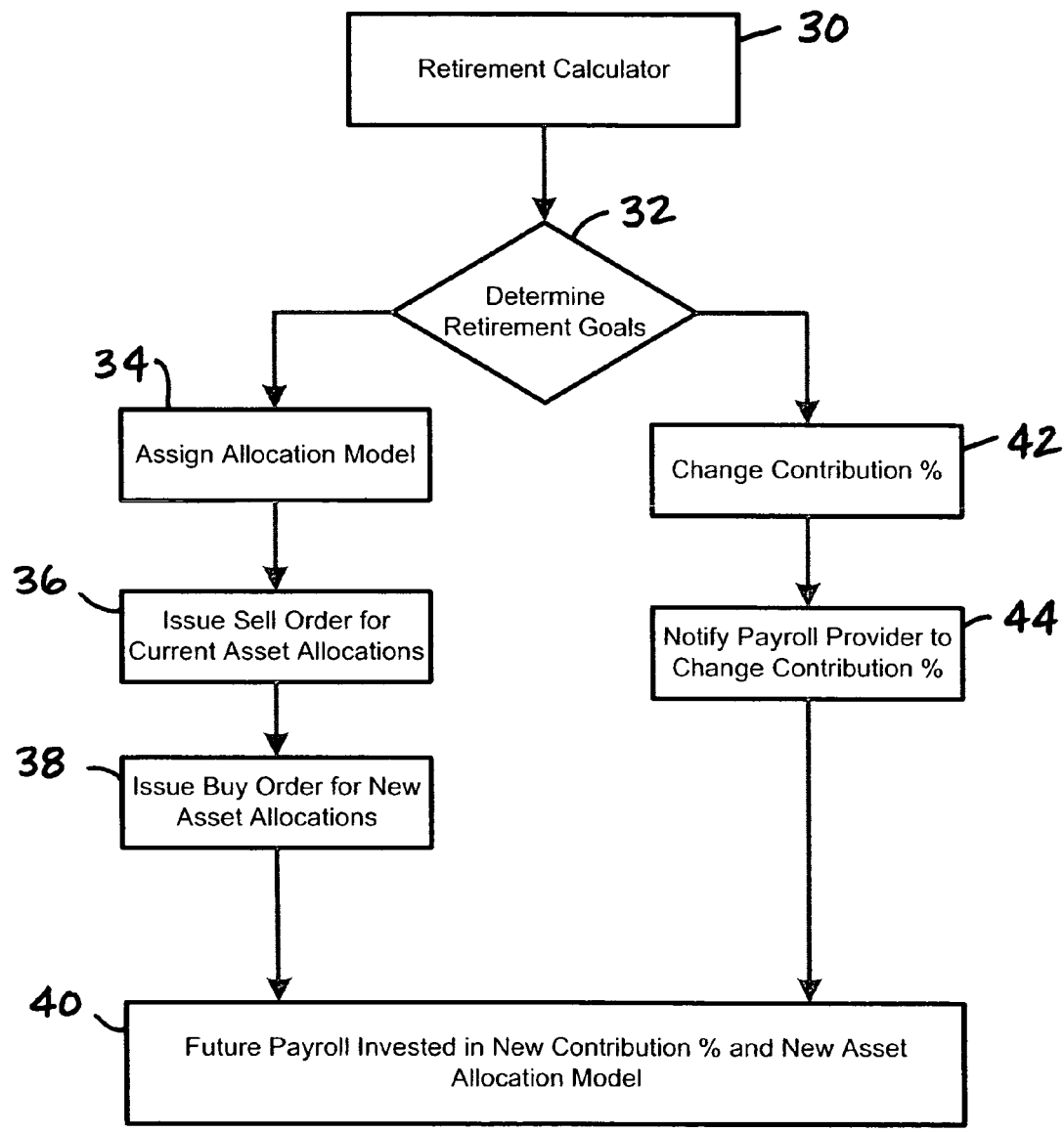
FIG. 2 is a flowchart of a method for managing tax deferred retirement accounts in accordance with the present invention.

FIG. 2 illustrates a retirement calculator 30 of a preferred embodiment of the computer software that participants may use to determine how much money should be saved each year in order for each participant to establish a retirement fund of sufficient size to pay the participant's living expenses during the retirement years. Preferably, the calculator 30 determines the participant's retirement goals as indicated at 32 and shows the participant the rate of return and annual contribution to the 401(k) savings account required to achieve those goals. As indicated at 34, the calculator 30 preferably also assigns an asset allocation model 34 appropriate for the participant based on the participant's information, which is further discussed below. Preferably, a default asset allocation model is assigned, but a participant may change his or her asset allocation model, if desired. As shown at 36, system 10 preferably allows each participant to issue a sell order for current asset allocations and to issue a buy order for new asset allocations as shown at 38. As indicated at 42, each participant is also preferably allowed to change the percentage of his or her payroll that will be contributed to the retirement plan each pay period. System 10 also preferably notifies the participant's payroll provider to change the participant's contribution percentage in accordance with the participant's wishes as illustrated at 44. As indicated at 40, future payroll contributions to the plan are then invested according to the participant's specified contribution percentage and asset allocation model.

As shown in FIG. 3, a retirement calculator in accordance with the present invention preferably provides user-entry fields in which a participant may enter data for a series of parameters including his or her current age, a proposed retirement age, an estimated annual inflation rate, a target annual rate of return, an annual income, an estimated annual salary increase percentage, the percentage of current income desired at retirement, the participant's/employee's contribution percentage, the employer's matching contribution percentage, if any, the current value of the participant's 401(k) savings account, the value of the participant's other tax-deferred retirement savings accounts, such as an IRA, and the value of any taxable retirement savings accounts, such as money market accounts. For convenience, the system preferably provides an on-screen calculator that may be used to calculate any desired quantities.

Historically, inflation has averaged about 3.5% over the course of the 20th century, so a reasonable default value for inflation is about 3%. Factoring in inflation helps estimate future income needs in inflated future dollars. Preferably, the retirement calculator computes the percentage of current annual income, which the participant indicated he or she will need by retirement age, adjusted each year for inflation or salary increases, whichever is greater. If the annual salary increases by 5%, for example, the future income need will increase by 5% since 5% is greater than the historical inflation rate of 3%. However, if the annual salary increases by only 2%, for example, the future annual income needed will be computed based upon the historical rate of inflation of 3%. Of course, the percentages indicated herein are exemplary and not limiting to the present invention.

To maintain the participant's desired lifestyle at retirement, the participant enters the desired percentage of his or her current income desired at retirement. In order to calculate the retirement funds needed based on the participant's desired income at retirement, the first year of retirement income is preferably compounded by 3% for inflation and the number of years of retirement based on life expectancy. As reported in the 1997 Replacement Ratio Study conducted by Georgia State University, experts predict that a participant will need approximately 65 to 85 percent of the participant's current income to maintain his or her present lifestyle in retirement. Of course, the needed funds will vary from person to person depending on the desired lifestyle, and the percentages used herein are exemplary and not limiting to the present invention.

After retirement begins, although some expenses may drop, such as work related expenses and paying into Social Security and other taxes, other expenses may either stay the same or increase. A person's basic living expenses typically stay the same; however, health care costs and medical expenses often increase. In the early retirement years, some expenses go up because the retiree has new found freedoms with time to travel, rediscover old hobbies, or pick up new ones. During the middle retirement years, some expenses may drop as the retiree travels less and stays closer to home. In the later years, income needs are largely determined by health care costs, as reported by National Underwriter in 1997. Those factors should be taken into account, if possible, as a participant plans for the desired level of income during retirement.

The annual income needed by retirement age is computed taking into consideration inflation and salary increases. This resulting figure is then compounded at 3% annually, for inflation, until life expectancy. Life expectancy is preferably estimated using the IRS Unisex Life Expectancy Table from IRS Publication 590 or some other suitable life expectancy data. Unquestionably, people now are living longer, which further complicates retirement planning. A study published in the May/June 1999 issue of the Bank Securities Journal estimates that 60% of today's 65 year olds will live to age 85, 12% will reach age 95, and 8% will live to celebrate their 100th birthday. Life expectancies are typically stated as statistical averages, meaning that a given person could live more years or fewer years than the stated life expectancy. Approximately 50 percent of all people die before life expectancy and the other 50 percent live well beyond their life expectancy.

The participant preferably enters a contribution rate and a company match, if any, for his or her 401(k) savings plan. The contribution rates determine the participant's annual savings. The annual savings are compounded based on the participant's increase in salary, until retirement age, and are also compounded by the targeted rate of return in order to determine the future value of the participant's 401(k) savings.

Not surprising, most participants contribute up to the level of the company match. Generally speaking, this is viewed as a positive result indicating that participants understand the mechanics of the match and appreciate its value. However, according to a PlanSponsor Exclusive 2003 Recordkeeping Survey, there is evidence which suggests that some participants believe the match is a company-sanctioned benchmark representing either (i) how much they should save or (ii) a cap on the maximum amount they can save. In reality, the Internal Revenue Service (IRS) allows a participant to contribute up to 100% of the person's salary to a 401(k) plan, subject to an annual maximum dollar amount, which is presently $13,000 for the year 2004, for example. Any employer matching contributions will be additional savings above the IRS's annual limit. Additionally, if a 401(k) plan includes a "catch-up" provision for employees age 50 and over, such participants may contribute an additional "catch-up" amount, which is $3,000 for the year 2004, for example.

A participant may enter the market value of any other tax-deferred and/or taxable accounts which are earmarked for retirement. If the participant has several statements they may use the online calculator to add the value of the accounts and copy and paste in the appropriate boxes.

The rate of return entered on the data input page is preferably used for all financial calculations and projections. If a participant enters a rate of return higher than the historical rate of returns earned during a given period, such as 1973 to 2003, for example, the participant preferably will receive an error message, such as "Rate of Return (ROR) exceeds Historical ROR for asset allocation models. Enter a lower rate of return." For example, during the time period beginning 1973 and ending 2002, earning a rate of return in excess of 14 percent fell outside the scope of the historical returns for each of the asset classes (cash, stocks, and bonds); including, any combination of the classes: U.S. Bonds, Money Market, Small Cap Stocks, Large Cap Stocks, International Stocks.

As shown in FIG. 4, the computer software of the present invention preferably calculates the results based on the participant's input and displays the results. The results page preferably illustrates the annual percentage of income the participant must save in order to establish his or her needed retirement fund. The results page also preferably identifies the name of the asset allocation model that matches the participant's targeted rate of return. If the participant is not taking advantage of the employee's maximum matching contribution, the results page preferably alerts the participant to this fact. If the projected funds are insufficient to meet the participant's goals, the results page also preferably alerts the participant to the fact that he or she is not contributing enough in order to achieve his or her retirement goals and identifies some possible courses of action to remedy that situation, such as targeting a higher rate of return (ROR), saving more, re-evaluating the income needed at retirement, or retiring at a later age.

The results page also preferably provides more information for the participant to consider if the projections demonstrate a shortage at retirement. To determine if a participant will have a shortage (deficit) in his or her retirement fund by the desired retirement age, the estimated future value of the current retirement portfolio(s) is subtracted from the estimated retirement fund need. If the calculations project a deficit by the time the participant reaches retirement age, the participant is preferably invited to consider several options, such as:

(a) consider saving in a tax-deferred account by making contributions, preferably maximum contributions, to a tax-deferred retirement account; e.g., IRA, 401(k) Plan, or Roth IRA;

(b) consider reallocating the investment portfolio in order to increase the target rate of return on investments;

(c) consider delaying retirement because each year retirement is delayed increases the investment contributions and decreases the retirement withdrawals;

(d) consider reevaluating future income needs with a view toward decreasing the desired amount, if possible.

By the time a participant reaches retirement age, the participant will need a retirement fund from which he or she may pay his or her annual living expenses, through life expectancy. The results page preferably illustrates the estimated retirement fund needed, in future value, i.e., taking into consideration inflation and years of retirement based on life expectancy. The participant's targeted rate of return is used to calculate the growth of the savings, for all accounts earmarked for retirement, up to retirement age. The future values are then totaled to illustrate the participant's projected retirement savings needed. If the projections illustrate that the participant will have a deficit at retirement age, the results page preferably illustrates the dollar amount of the deficit and also preferably illustrates the additional percentage annual contribution the participant will need to make in order to reach his or her retirement goal.

In the embodiment of FIG. 4, the retirement calculator preferably returns information separated into three groups, namely, a savings status and future value chart, a contribution summary, and a list of assumptions used by the retirement calculator in arriving at the savings and future value numbers. The savings status and future value group is named "Savings Earmarked For Retirement," and provides a participant with information on the current value of the participant's 401(k) account, the current value of other tax-deferred retirement savings accounts, the current value of taxable retirement savings accounts, the future value of retirement savings, the size of the fund calculated as needed for retirement, the shortfall (or excess, as the case may be) of the future value of the retirement fund with respect to the needed fund, the amount that must be set aside annually to make up that shortfall, both as a dollar amount and as a percentage of annual income needed, and the asset allocation model.

The contribution summary is provided under the "Summary" label in FIG. 4 and preferably informs the participant whether the participant's contribution is sufficient to reach the participant's retirement goals. The contribution summary also preferably informs a participant of the steps that might be taken to re-evaluate the investment approach, such as targeting a higher rate of return (ROR), saving more money, re-evaluating the income needed at retirement, or retiring at a later age.

The list of assumptions used by the retirement calculator in arriving at the savings and future value numbers is preferably provided under the "Assumptions" summary in FIG. 4. In this embodiment, those assumptions include the participant's current age, desired retirement age, life expectancy, years of investing, years of retirement payout, marginal tax rate, contribution election percentage, target annual rate of return, estimated annual rate of inflation, estimated annual salary increase, current annual income, percentage of current income desired at retirement, and calculated retirement income need taking into account estimated inflation and salary increases.

Preferably, a tax advantage calculator is also provided to allow a participant to determine what tax advantages may be obtained by participating in a tax-deferred account such as a 401(k) plan. FIG. 5 illustrates one embodiment of such a tax advantage calculator. As seen in FIG. 5, a participant enters a value in the annual income amount field, the targeted rate of return field, the employee contribution rate (which is preferably a percentage) field, and a field for the matching contribution of the participant's employer, if any. The participant's tax rate bracket is also preferably stored or entered by the participant. The calculator preferably uses that information to return projected investment performance data to the participant, as in the table illustrated in FIG. 5. Using the information input by the participant, the calculator multiplies the participant's contribution rate by the annual income to return the employee's total annual contribution to the 401(k) plan. The calculator also preferably illustrates tax advantages associated with saving that amount through a company's 401(k) plan as compared to saving the same amount in a taxable account, and provides a comparison of the future value of those accounts. In the table of FIG. 5, for example, the future value of the taxable savings and 401(k) savings are illustrated for 5, 10, 15, 20, and 25 years. Additionally, the calculator preferably provides a field entry for a participant to enter a desired number of years to determine the respective future values of those accounts in a specified number of years. Using the calculator, then, the plan participant is able to change, for example, the rate of return and contribution percentage to determine what impact those variations will have on the future value of the 401(k) and taxable accounts for a given number of years in the future. Thus, the tax advantage calculator of the present invention demonstrates the tremendous tax advantage that participants gain by saving for retirement through their company's 401(k) plan.

Pre-Designed Asset Allocation Models:

The performance of a portfolio has two primary factors: (i) investment return and (ii) volatility. A ten-year Brinson Study concluded that 93.6% of investment performance is based on allocation between the asset classes, e.g., cash, stocks, and bonds. The fundamental tenet that asset allocation has the greatest impact on long-term total investment returns has been embraced by large institutions and sophisticated investors, who are increasingly turning to asset-class investing according to methods known in the art. Asset-class investing involves investing and committing to whole markets rather than buying individual securities.

Most plan participants are unlikely to acquire the skills needed to build suitable portfolios like professional fiduciaries of institutional plans. Therefore, in accordance with the present invention, each plan participant is preferably defaulted to a pre-designed asset allocation model, which the participant may change at any time if desired. By placing a participant in a pre-designed asset allocation model, the participant is able to realize the benefits of the "best practices" presently used by institutional investors instead of being relegated to indiscriminate fund picking, which is thrust upon them by other service providers, whose "solution" is to offer an overabundance of fund choices.

For example, some predefined asset allocation models based on historical returns for each asset class from 1973 to 2003 as reported by Wiesenberger, Barclays Global Investors, N.A. and Dimensional Fund Advisors may be composed as follows:

(a) Aggressive: 6 down years; lowest one-year return of −25.55%; highest one-year return of 44.65%; annualized historical rate of return of 13.22%;

(b) Conservative: 4 down years; lowest one-year return of −4.31%; highest one-year return of 20.45%; annualized historical rate of return of 9.18%;

(c) Growth: 6 down years; lowest one-year return of −14.48%; highest one-year return of 32.43%; annualized historical rate of return of 11.35%;

(d) Moderate: 6 down years; lowest one-year return of −11.56%; highest one-year return of 29.75%; annualized historical rate of return of 11.13%;

(e) Preservation: 1 down year; lowest one-year return of −0.09%; highest one-year return of 20.49%; annualized historical rate of return of 8.36%.

FIG. 6 illustrates a sample moderate asset allocation model.

Of course, historical performance does not guarantee future performance, and the foregoing examples are by way of illustration only and are not limiting to the present invention.

Automatic Portfolio Rebalancing:

When an asset in a portfolio performs extraordinarily well or, conversely, performs poorly, its portfolio weighting will increase or decrease, which in turn will throw the participant's target asset allocation out of alignment. To return the portfolio to its target composition, a participant would have to sell enough of the over-weighted assets and buy enough of the under-weighted assets in order to bring the portfolio back in alignment with the criteria for division between the asset classes for the model.

In order to maintain the division criteria for each participant's allocation model, the present invention preferably automatically rebalances each participant's portfolio on a regular basis, such as a quarterly basis, for example. To rebalance the portfolios, a system in accordance with the present invention sells the investments that have over-performed for the quarter and buys the investments that have under-performed to bring the portfolio back in alignment with the applicable asset allocation model.

Figure 12:
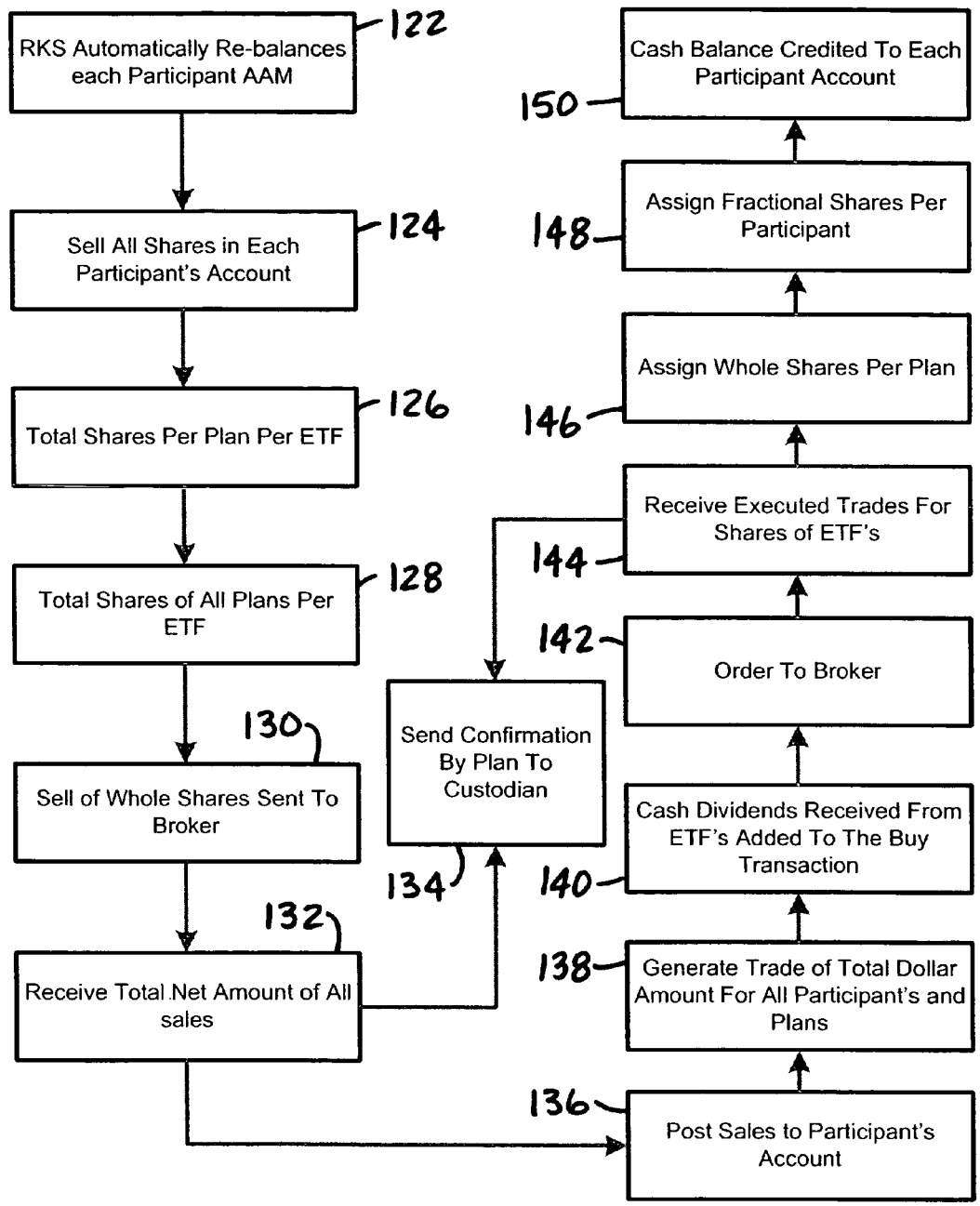
FIG. 12 is a flowchart of a portfolio rebalancing process in accordance with the present invention.

Referring to FIG. 12, the record keeping system (RKS) preferably automatically rebalances each participant's portfolio based on the applicable asset allocation model as indicated at 122. As indicated at 124, a pending transaction is created to sell all shares of ETFs in each participant's account. Next, the system totals all shares of ETFs for each plan as indicated at 126 and totals all shares of ETFs for all plans as indicated at 128. Then a sell order is sent to the broker to sell all whole shares as indicated at 130. After the sell is executed, the broker sends a report to the RK for the executed trade price, shares sold, and dollar amount received at the custodian for each ETF sold as indicated at 132. The RK preferably sends a confirmation report by plan to the custodian as indicated at 134. The RK divides the omnibus settlement amount by plan and then divides the plan settlement amount by participant and posts the sales to each participant's account as indicated at 136. A buy is then created for each participant based on each participant's percent allocated for each ETF in the participant's asset allocation model to generate a trade of the total dollar amount for all participants and plans as indicated at 138. As indicated at 140, each participant's account is credited for any cash dividends received for ETFs. After totaling all buys of ETFs for each plan and all buys of ETFs for all plans, buy orders are sent to the broker to buy shares of ETFs as indicated at 142. As indicated at 144, after the buys are received and executed by the broker, the broker sends a report to the RK for the executed trade price and shares purchased for each ETF. The RK then sends a confirmation report by plan to the custodian as indicated at 134. The RK then divides the omnibus ETF buys, per plan, per whole shares as indicated at 146, and then credits fractional shares to participants as indicated at 148. Finally, the appropriate cash balance is credited to each participant's account as indicated at 150. In this manner, each participant's account is rebalanced in accordance with the appropriate asset allocation model.

Figure 7:
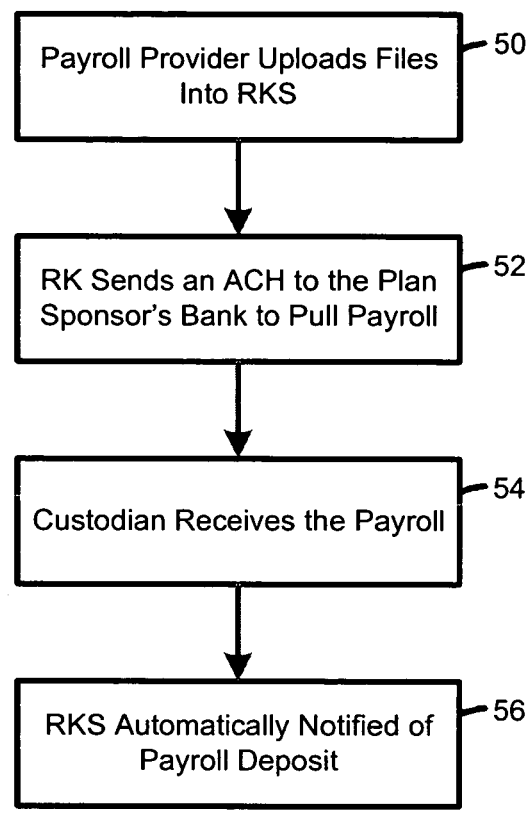
FIG. 7 is a flowchart of a payroll deposit process in accordance with the present invention.

ETF Trading Process:

Referring to FIG. 7, the payroll provider preferably uploads payroll files in the RKS as indicated at 50. Each company's payroll files preferably contain each participant's deferral contribution identified by the source, e.g., employee pretax, employer match, catch up, loan payment, and/or profit sharing contribution. The RK then sends an ACH request to the plan sponsor's bank to pull payroll as indicated at 52. Next, the custodian receives the payroll as indicated at 54, and the RKS is automatically notified of the payroll deposit as indicated at 56.

Figure 8:
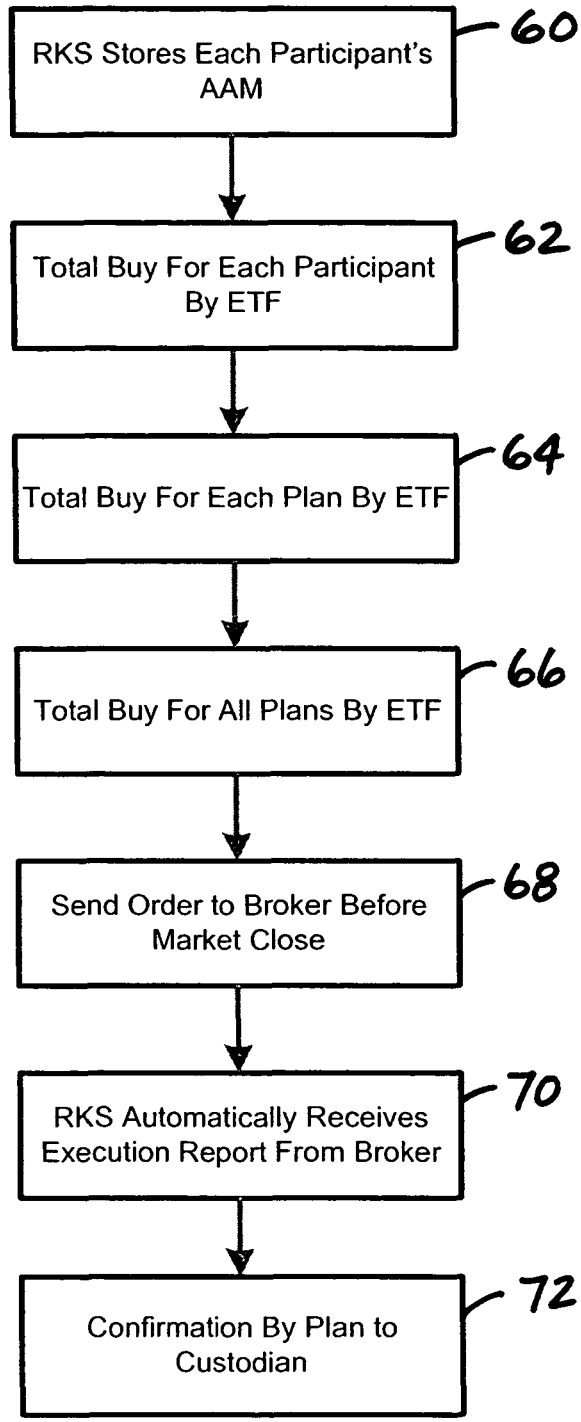
FIG. 8 is a flowchart of a payroll contribution process in accordance with the present invention.

As shown in FIG. 8, RKS preferably stores each participant's asset allocation model (AAM) in memory as indicated at 60, which determines which ETFs are to be purchased for each participant. Based on that information, the software computes the total buy amount for each participant by ETF as indicated at 62, then computes the total buy amount for each plan by ETF as indicated at 64, and then computes the total buy amount for all plans by ETF as indicated at 66. Preferably, one trade file is created per ETF for all plans, which results in an omnibus trade file for each ETF covering all applicable plans and participants. Next, the software sends a buy order to the broker for all the appropriate ETFs before market close as indicated at 68. The RKS automatically receives an execution report from the broker as indicated at 70, and a confirmation message is preferably sent to the custodian as indicated at 72.

Figure 9:
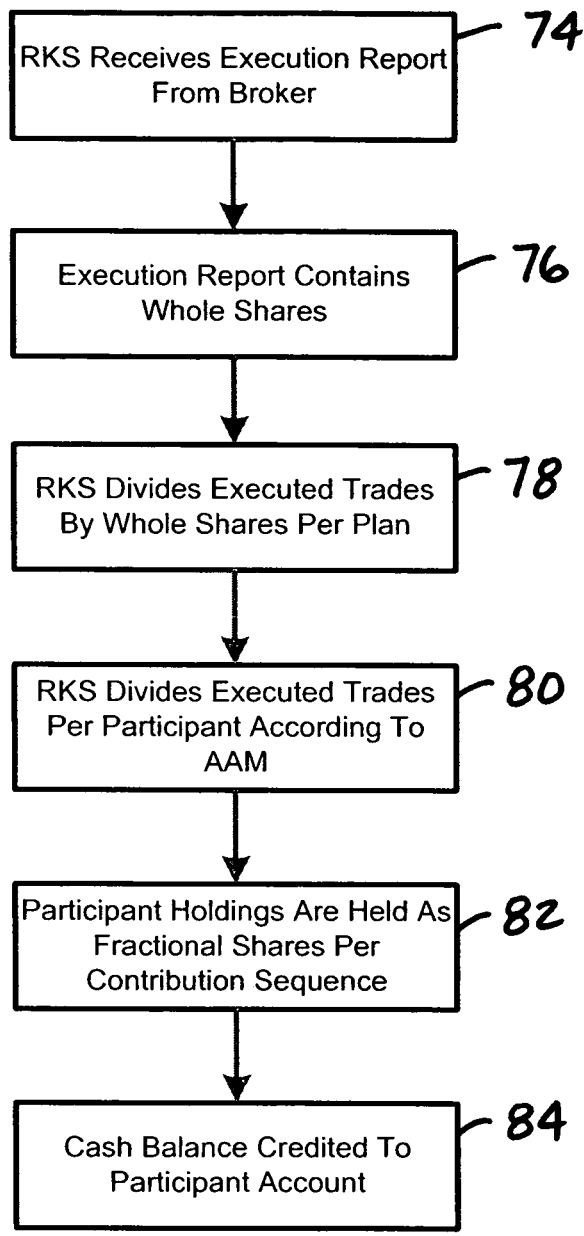
FIG. 9 is a further flowchart of a payroll contribution process in accordance with the present invention.

Referring to FIG. 9, the execution report that the RKS receives from the broker (as indicated at 74) contains whole shares of the appropriate ETFs as indicated at 76. The RKS preferably divides the executed trades (purchased ETFs) by whole shares per plan as indicated at 78, and the RKS preferably divides the executed trades per participant according to each participant's asset allocation model as indicated at 80. Each participant's holdings are thus held as fractional shares per each contribution sequence as indicated at 82, and the appropriate cash balance is credited to each participant's account as indicated at 84.

Trading ETFs in a 401(k) plan on an omnibus level allows the participants to reap the benefits of ETFs without incurring high brokerage commissions. This method significantly lowers the overall costs for participants; for example, costs may be reduced from 30 to 160 basis points or more over retail mutual funds.

John Bogle explained the logic of lower costs in his paper, *The First Index Mutual Fund: A History of Vanguard Index Trust and the Vanguard Strategy*. In the academic world, the Index Thesis demonstrates that all investors, as a group, are the market. Since all investors are the market, there is no way they can outpace the market. However, that fact holds true only before the cost of investing is considered. After investment costs are considered, the returns of all investors inevitably lag the market by the amount of the cost.

The inclusion of ETFs, which cover all of the major indices, also provides the present invention more latitude in designing asset allocation models. This latitude allows the present invention the ability to offer participants well-structured, diversified asset allocation models; e.g., preservation, conservative, moderate, growth and aggressive.

Participant Termination.

Figure 10:
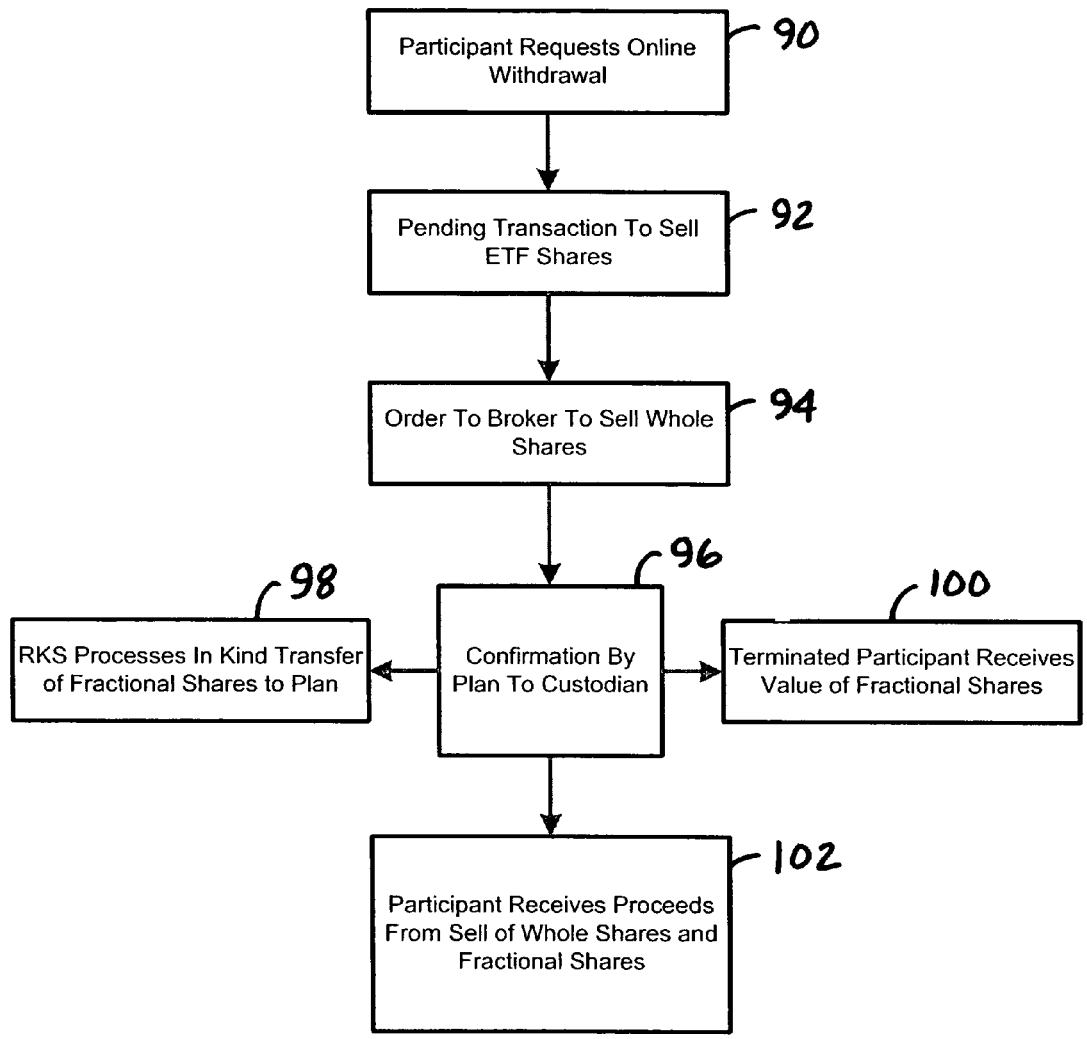
FIG. 10 is a flowchart of a participant termination process in accordance with the present invention.

Referring to FIG. 10, when a participant terminates employment, such a participant usually requests to withdraw his or her account balance from his or her 401(k) account as indicated at 90. Such a withdrawal request is preferably made online. Based on the withdrawal request, a pending transaction is created to sell all shares of ETFs in the participant's account as indicated at 92, and an order is sent to the broker to sell whole shares of ETFs as indicated at 94. After the sell is executed, the broker preferably sends a report to the RK reflecting the executed trade price, the number of shares sold, and the dollar amount received at the custodian for each ETF sold. A confirmation is preferably sent to the custodian as indicated at 96, the RKS processes an in kind transfer of fractional shares to the appropriate plan as indicated at 98, and the terminated participant receives the value of the fractional in kind transferred ETF shares previously owned by the participant as indicated at 100 based on the executed price from the sale of the whole shares. Finally, the terminated participant receives the proceeds from the sale of the appropriate whole shares and fractional shares as indicated at 102.

Participant Withdrawal.

Figure 11:
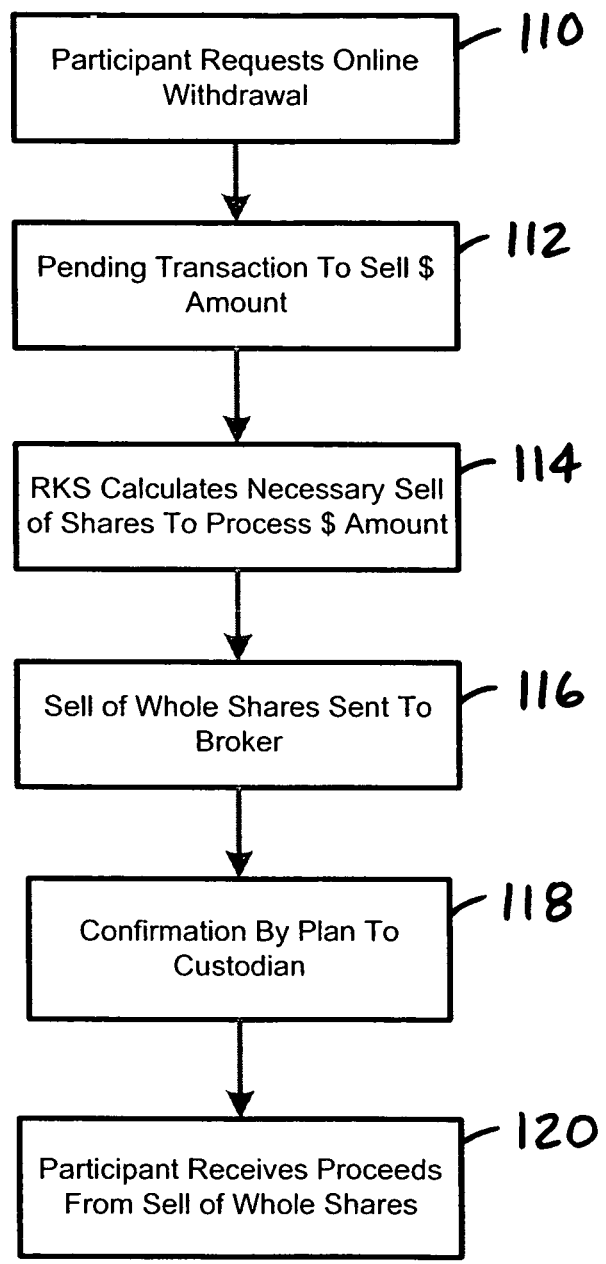
FIG. 11 is a flowchart of a participant withdrawal process in accordance with the present invention.

As shown in FIG. 11, participants generally may request a withdrawal from their accounts for a loan, a hardship, or retirement income. Such a withdrawal request is preferably made online as indicated at 110, whereupon a pending transaction is created to sell a dollar amount of ETF shares equal to the withdrawal requested as indicated at 112. As indicated at 114, the RKS preferably calculates the number of shares needed to be sold in order to deliver the dollar amount requested, and a sell order is sent to the broker to sell whole shares as indicated at 116. After the sell is executed, the broker preferably sends a report to RK reflecting the executed trade price, the number of shares sold, and the dollar amount received at the custodian for each ETF sold. RK preferably sends a confirmation report by plan to the custodian as indicated at 118. Finally, the participant receives the proceeds from the sale of whole shares as indicated at 120.

Participant Rebalance or Change of Model.

Figure 13:
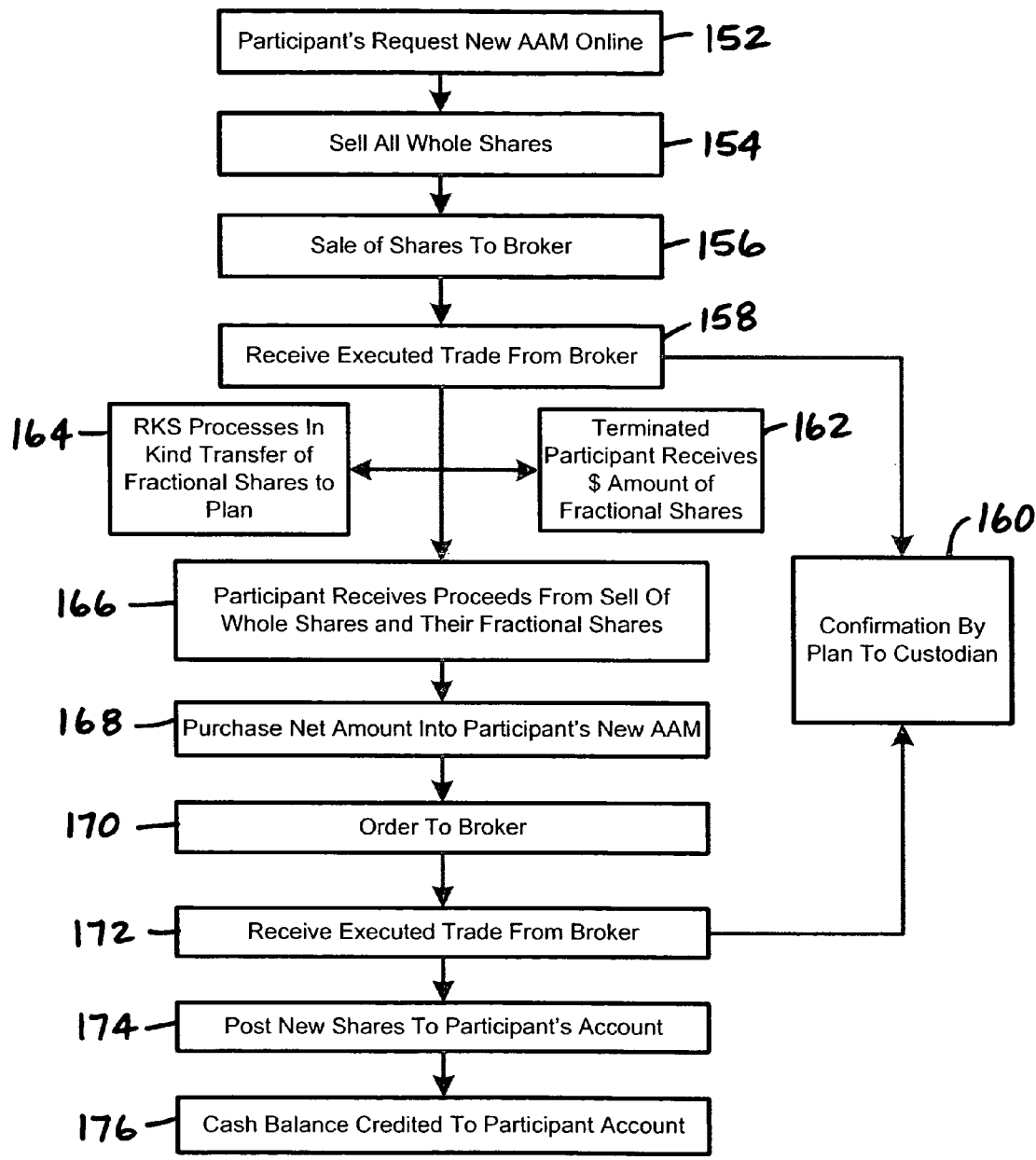
FIG. 13 is a flowchart of an asset reallocation process in accordance with the present invention.

Referring to FIG. 13, participants preferably may request a rebalance or change in their asset allocation model. Again, such a request is preferably made online as indicated at 152. In response to such a request, a pending transaction is preferably created to sell all shares of ETFs in the requesting participant's account as indicated at 154, and a sell order is sent to the broker to sell whole shares as indicated at 156. After the sell is executed, the broker preferably sends a report to the RK reflecting the executed trade price, the number of shares sold, and the dollar amount received at the custodian for each ETF sold as indicated at 158. The RK preferably sends a confirmation report by plan to the custodian as indicated at 160. The RKS preferably processes an in-kind transfer of the fractional shares to the plan as indicated at 164, and the participant receives the value of such fractional shares as indicated at 162. The participant then receives the proceeds from the sale of whole shares and fractional shares as indicated at 166. Then, transactions for buys are generated to purchase other ETFs for the participant based on the participant's new asset allocation model as indicated at 168, and corresponding buy orders are sent to the broker to buy whole shares as indicated at 170. After the buys are executed, the broker sends a report to the RK reflecting the executed trade price and the number of shares purchased for each ETF as indicated at 172, and the RK preferably sends a confirmation report by plan to the custodian as indicated at 160. The new ETF shares are then posted to the participant's account as indicated at 174, and the corresponding cash balance is credited to the participant's account as indicated at 176.

As persons skilled in the art will appreciate, the present invention thus provides at least the following benefits: diversified investment options, including ETFs, which cover all the major indices; reduced management fees; well-structured, pre-designed asset allocation models; financial tools to enable a participant to accurately determine his or her retirement needs and choose an asset allocation model which will assist the participant in actually reaching his or her retirement goals; and the availability of sufficient investment information so that participants of any sophistication may make their own well-informed investment decisions.

The combination of these benefits increases the chances that a participant will retire with an adequate retirement fund. To put these benefits in perspective, one must keep in mind that fees and performance returns have a direct relationship, i.e., investment fees reduce the returns of each fund by the amount of the investment fees. For example, by reducing participants' fees by 97 basis points annually, an average participant with a $50,000 balance and an annual contribution of $12,000 per year will have $120,435 more in their retirement portfolio in 20 years, $243,321 more in 25 years, and $463,647 more in 30 years.

According to a Public Agenda Study, forty-six percent of Americans have saved less than $10,000 for retirement, only twenty-nine percent of pre-retirees (the 51 to 61 age group) have saved $100,000 or more and only nineteen percent of our work force save each time they receive a paycheck. Instead of guessing how much money the participant will need by retirement age, the present invention allows a participant to perform "what if" scenarios in order to accurately determine the amount of money they will need in retirement. In this way, a participant can use the tools of the present invention to illustrate whether the participant needs to contribute more to his or her retirement fund in order to reach his or her goal.

The present invention is the first and only means for a 401(k) service provider to offer ETFs as investment options in 401(k) plans without requiring each participant to either establish a self-directed brokerage account or invest in ETFs by purchasing units of a "collective trust." The present invention offers investment in ETFs without these prohibitive costs attached by trading on an omnibus level, which enables trading costs for each participant to amount to less than a penny on the dollar for each trade.

Although the foregoing specific details describe a preferred embodiment of this invention, persons reasonably skilled in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. An article of manufacture for managing tax-deferred retirement accounts, comprising:
   a non-transitory computer readable medium comprising computer program instructions executable by a computer processor for managing a plurality of tax-deferred retirement accounts for a plurality of participants participating in a plurality of plans;
   said instructions comprising a record keeping system configured for investing contributions periodically in at least one exchange traded fund in said plurality of tax-deferred retirement accounts for each of said plurality of participants, said at least one exchange traded fund comprising a plurality of exchange traded funds;
   said instructions further configured for allocating shares of said at least one exchange traded fund to each of said plurality of participants in accordance with their respective contributions;
   said shares being selected from whole shares and fractional shares in amounts commensurate with said respective contributions; and
   said record keeping system further comprising instructions for:
      computing a total buy amount for each of said plurality of participants for each of said plurality of exchange traded funds;
      computing a total buy amount for each of said plurality of plans for each of said plurality of exchange traded funds;
      computing a total buy amount of whole shares for all of said plurality of plans for each of said plurality of exchange traded funds; and
      creating an omnibus trade file for each of said plurality of exchange traded funds covering all of said plurality of plans and all of said plurality of participants;
   wherein said record keeping system further comprises instructions, for each one of said plurality of exchange traded funds in which an investment has been made, for:
      receiving a report of purchased whole shares;
      allocating said purchased whole shares among respective ones of said plurality of plans for which said investment has been made;
      for each of said plurality of plans that receives a portion of said purchased whole shares, allocating said portion of said purchased whole shares among respective ones of said plurality of participants that have invested in said one of said plurality of exchange traded funds; and
      allocating to said respective ones of said plurality of participants fractional shares of said one of said plurality of exchange traded funds and a cash balance.

2. The article of claim 1 wherein said record keeping system includes instructions for receiving an indication to terminate participation by one participant of said plurality of participants in said participant's respective one of said plurality of plans, and, in response to receiving said indication to terminate:
   selling whole shares of each of said plurality of exchange traded funds in which said participant holds an investment; and
   processing an in kind transfer of fractional shares of each of said plurality of exchange traded funds in which said participant holds an investment to said participant's respective one of said plurality of plans.

3. The article of claim 1 wherein said record keeping system includes instructions for receiving an indication with respect to one participant of said plurality of participants to rebalance said participant's respective one of said plurality of tax-deferred retirement accounts according to a new asset allocation model, and, in response to receiving said indication to rebalance:
   selling whole shares of each of said plurality of exchange traded funds in which said participant holds an investment;
   processing an in kind transfer of fractional shares of each of said plurality of exchange traded funds in which said participant holds an investment to the respective one of said plurality of plans in which said participant is participating;
   allocating the value of said whole shares of each of said plurality of exchange traded funds in which said participant holds an investment and said fractional shares of each of said plurality of exchange traded funds in which said participant holds an investment to said participant;
   buying whole shares of other ones of said plurality of exchange traded funds based on said new asset allocation model; and
   crediting a cash balance to said participant.

4. A non-transitory computer readable medium comprising computer program instructions executable by a computer processor for managing a plurality of tax-deferred retirement accounts within a plurality of tax-deferred retirement plans for a plurality of participants, wherein each of said plurality of tax-deferred retirement plans allows investment in at least one exchange traded fund, said computer program instructions comprising instructions for:

receiving an indication of a respective contribution to be invested on behalf of each of said plurality of participants in a respective one of said plurality of tax-deferred retirement accounts;

calculating a total buy amount sufficient to purchase a total number of whole shares of said at least one exchange traded fund based on the total amount of said respective contributions;

allocating a respective whole number portion of said total number of whole shares to each of said plurality of tax-deferred retirement plans based on a sub-total of said respective contributions for said plurality of participants within each respective one of said plurality of tax-deferred retirement plans; and for each plan of said plurality of tax-deferred retirement plans, apportioning the respective whole number portion of said total number of whole shares by allocating to each of said plurality of participants within said plan an investment in a respective one of said plurality of tax-deferred retirement accounts in the amount of said respective contribution, said investment comprising:

(a) at least one whole share of said at least one exchange traded fund;

(b) a fractional share of said at least one exchange traded fund; and (c) a cash balance.

5. The computer readable medium of claim 4 wherein said respective contribution comprises a periodic contribution.

6. The computer readable medium of claim 4 wherein said at least one exchange traded fund comprises a plurality of exchange traded funds.

7. The computer readable medium of claim 6 wherein said computer program instructions further comprise instructions for investing said respective contribution among said plurality of exchange traded funds according to an asset allocation model.

8. The computer readable medium of claim 7 wherein said computer program instructions further comprise instructions for periodically rebalancing a respective one of said plurality of tax-deferred retirement accounts according to said asset allocation model.

\* \* \* \* \*